United States Patent
Bartosz et al.

(10) Patent No.: US 10,981,655 B2
(45) Date of Patent: Apr. 20, 2021

(54) CARBON DIOXIDE ADSORBER FOR AIRCRAFT

(71) Applicant: Hamilton Sundstrand Corporation, Charlotte, NC (US)

(72) Inventors: Lance R. Bartosz, Granby, MA (US); Catherine Thibaud, Cork (IE)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 195 days.

(21) Appl. No.: 16/198,014

(22) Filed: Nov. 21, 2018

(65) Prior Publication Data
US 2020/0156796 A1     May 21, 2020

(51) Int. Cl.
*B01D 53/04*     (2006.01)
*B64D 13/06*     (2006.01)
*B01D 53/047*     (2006.01)

(52) U.S. Cl.
CPC ........... *B64D 13/06* (2013.01); *B01D 53/047* (2013.01); *B01D 2253/10* (2013.01); *B01D 2257/504* (2013.01); *B01D 2259/4575* (2013.01); *B64D 2013/0637* (2013.01); *B64D 2013/0688* (2013.01)

(58) Field of Classification Search
CPC .............. B01D 53/0454; B01D 53/047; B01D 2253/10; B01D 2253/34; B01D 2257/504; B01D 2259/40096; B01D 2259/4575; B01D 2259/65; B64D 13/06; B64D 2013/0637; B64D 2013/0688
USPC ...... 95/96, 114, 115, 139, 148; 96/121, 126; 423/230
See application file for complete search history.

(56) References Cited

U.S. PATENT DOCUMENTS 3,734,293 A *   5/1973   Biskis ............... B01D 53/0454
                                                 210/185
3,738,084 A *   6/1973   Simonet ............... B01D 53/261
                                                95/105
4,786,294 A      11/1988   Jonqueres et al.
(Continued)

FOREIGN PATENT DOCUMENTS

EA        016546 B1     5/2012
EP    DP 0332390 A2 *   9/1989
(Continued)

OTHER PUBLICATIONS

European Search Report for European Application No. 19209954.7; Application Filing Date Nov. 19, 2019; dated Feb. 26, 2020, 7 pages.

*Primary Examiner* — Frank M Lawrence, Jr.
(74) *Attorney, Agent, or Firm* — Cantor Colburn LLP (57) ABSTRACT

A system for processing recirculation air recovered from an aircraft cabin includes a mixing chamber and a carbon dioxide removal system. The carbon dioxide removal system has an inlet for recovered recirculation air from the aircraft cabin, an outlet to the mixing chamber; at least two assemblies of carbon dioxide sorbent that are thermally linked, a $CO_2$ outlet valve; and a controller for managing desorption of carbon dioxide from the sorbent depending on aircraft status. The mixing chamber has an inlet from the carbon dioxide removal system, an inlet from an environmental control system, and an outlet connected to the aircraft cabin.

10 Claims, 5 Drawing Sheets

(56) References Cited

U.S. PATENT DOCUMENTS

| | | | |
|---|---|---|---|
| 5,516,330 A * | 5/1996 | Dechow | B64D 13/08 165/235 |
| 5,642,729 A * | 7/1997 | Cassidy | A62B 7/14 128/204.29 |
| 5,695,396 A * | 12/1997 | Markwart | B64D 13/00 454/76 |
| 6,364,938 B1 | 4/2002 | Birbara et al. | |
| 6,709,483 B1 | 3/2004 | Hodgson, Jr. | |
| 6,755,892 B2 | 6/2004 | Nalette et al. | |
| 7,736,416 B2 | 6/2010 | Nalette et al. | |
| 9,341,408 B2 | 5/2016 | Fleming, Jr. et al. | |
| 9,597,629 B2 | 3/2017 | Matthias et al. | |
| 9,789,436 B2 | 10/2017 | Meirav et al. | |
| 10,017,257 B2 | 7/2018 | Ludvik et al. | |
| 10,046,266 B2 | 8/2018 | Meirav et al. | |
| 2005/0199124 A1 * | 9/2005 | Little | B01D 53/261 95/96 |
| 2012/0006193 A1 | 1/2012 | Roychoudhury et al. | |
| 2012/0160098 A1 * | 6/2012 | Papale | B01D 53/0438 95/106 |
| 2012/0160099 A1 * | 6/2012 | Shoji | B01D 53/025 95/139 |
| 2014/0161698 A1 | 6/2014 | Klimpel | |
| 2017/0239609 A1 | 8/2017 | Luisman et al. | |
| 2018/0050322 A1 | 2/2018 | Kimura et al. | |
| 2019/0039047 A1 * | 2/2019 | Kimura | B01J 20/3272 |
| 2020/0009533 A1 * | 1/2020 | Space | B01J 20/3483 |

FOREIGN PATENT DOCUMENTS

| | | |
|---|---|---|
| EP | 1964601 A2 | 9/2008 |
| EP | 3090950 A1 | 11/2016 |
| JP | 2014233690 A | 12/2014 |
| WO | 9817388 A1 | 4/1998 |
| WO | 2018156020 A1 | 8/2018 |

* cited by examiner

CARBON DIOXIDE ADSORBER FOR AIRCRAFT

BACKGROUND

Exemplary embodiments pertain to the art of systems and methods for removing carbon dioxide from recirculation air discharged from an aircraft cabin.

The air conditioning system for a modern passenger aircraft includes an air conditioning unit which is supplied with compressed process air from a compressor or bled off from an engine or an auxiliary power unit of the aircraft. Cooled air leaving the air conditioning unit is supplied to a mixing chamber where it is mixed with recirculation air from the aircraft cabin to result in mixed air. The mixed air is supplied to the aircraft cabin.

The carbon dioxide ($CO_2$) content of the recirculated air increases due to human respiration. The carbon dioxide content of the air returned to the aircraft cabin can be reduced by mixing with fresh air from the air conditioning unit, by adsorption, or by a combination thereof. While currently available systems are adequate, there is a need for more efficient systems and methods for reducing the carbon dioxide content of the recirculated air and the air returned to the aircraft cabin.

BRIEF DESCRIPTION

Disclosed is a system for processing recirculation air recovered from an aircraft cabin comprising a mixing chamber and a carbon dioxide removal system, wherein the carbon dioxide removal system has an inlet for recovered recirculation air from the aircraft cabin, an outlet to the mixing chamber; at least two assemblies of carbon dioxide sorbent that are thermally linked, a $CO_2$ outlet valve; and a controller for managing desorption of carbon dioxide from the sorbent depending on aircraft status and further wherein the mixing chamber has an inlet from the carbon dioxide removal system, an inlet from an environmental control system, and an outlet connected to the aircraft cabin.

Also disclosed is a method for processing recirculation air recovered from an aircraft cabin comprising supplying recovered recirculation air from the aircraft cabin to a carbon dioxide removal system having at least two thermally linked assemblies of carbon dioxide sorbent; removing carbon dioxide from the recovered recirculation air to form processed recirculation air, removing carbon dioxide from the carbon dioxide sorbent; mixing the processed recirculation air with conditioned fresh air and sending the mixture to the aircraft cabin, wherein the removal of carbon dioxide from the carbon dioxide sorbent is by reduced pressure, elevated temperature or both and is determined by the aircraft status.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Carbon dioxide removal from recovered recirculated aircraft cabin air may involve the use of a carbon dioxide sorbent. The carbon dioxide sorbent can be regenerated and used repeatedly. Regeneration can involve exposing the carbon dioxide sorbent to reduced pressure, elevated temperature or both. By using a controller to manage the regeneration conditions efficiency can be maximized depending upon the aircraft status. For example, at cruising conditions (elevated altitude), ambient pressure is less than the pressure of the aircraft cabin and pressurized areas of the aircraft. This low ambient pressure can be employed to provide reduced pressure for regeneration. When the aircraft is on the ground or the ambient pressure is too high for sufficient regeneration alone, elevated temperature can be used for regeneration. The controller monitors the ambient pressure and manages the regeneration method. When the regeneration method involves elevated temperature the thermal linking of the two sorbent beds helps to recover energy from the carbon dioxide adsorption in one bed and use it to facilitate the carbon dioxide desorption in the second bed. Through the use of a controller in combination with a carbon dioxide removal system the need for fresh air from the engine (via the air conditioning system) is reduced. Fresh air is typically provided as bleed air from the engines and the air is conditioned to achieve the desired temperature and pressure. Systems that reduce the demand for fresh air from the air conditioning system offer an opportunity to reduce overall aircraft energy consumption as compared with the current state of art.

According to the systems and methods described herein, process streams include cabin air. These process streams contain carbon dioxide that can be removed from the process stream.

Figure 1:
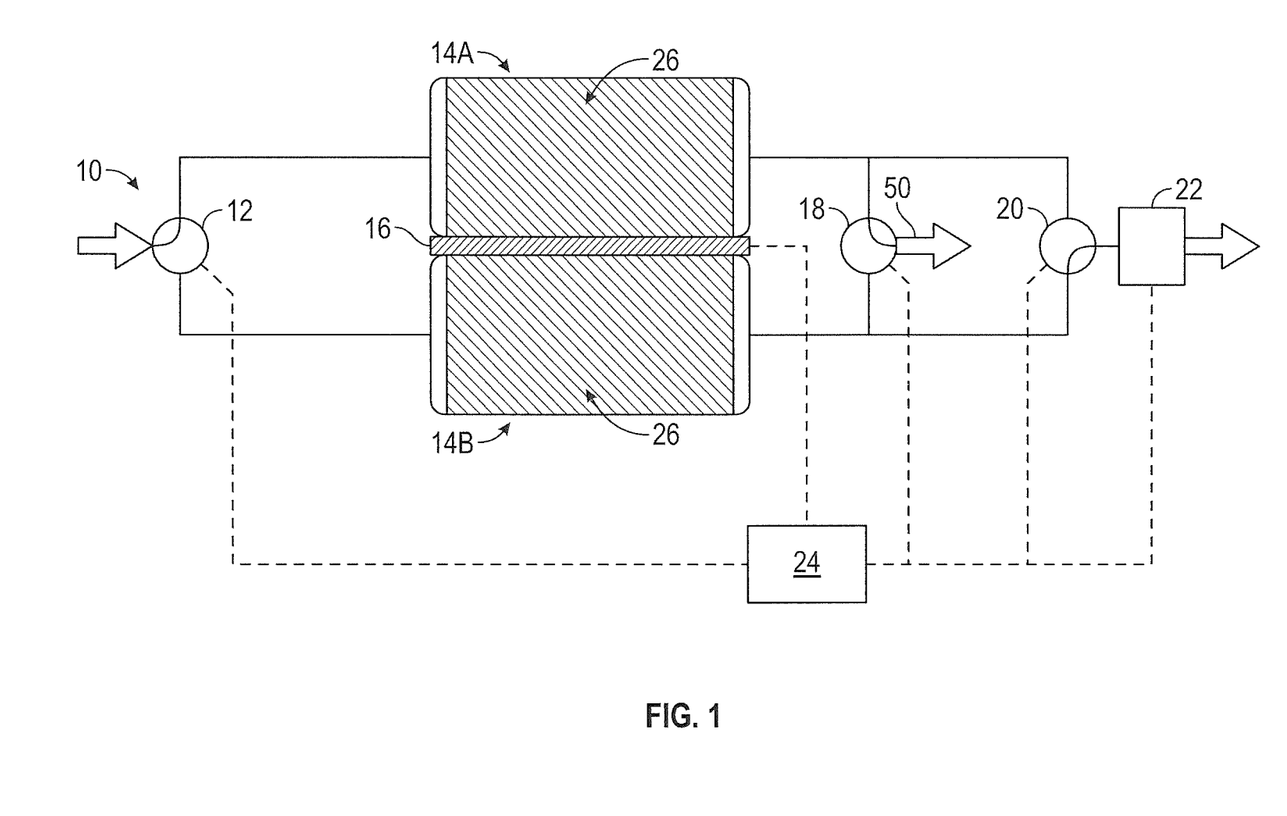
FIGS. 1 to 6 are schematics of recirculation air processing systems.

FIG. 1 illustrates one embodiment of carbon dioxide ($CO_2$) removal system 10. $CO_2$ removal system 10 includes inlet valve 12, first sorbent assembly 14A, second sorbent assembly 14B, heat exchange system 16, gas stream outlet valve 18, $CO_2$ outlet valve 20, and controller 24. A process stream enters $CO_2$ removal system 10 via inlet valve 12. The process stream is recovered recirculation air from an aircraft cabin. The process stream can be delivered to $CO_2$ removal system 10 by pump or other means. Inlet valve 12 allows the process air stream to communicate with first sorbent assembly 14A and second sorbent assembly 14B. Depending on the position of inlet valve 12, the process stream is directed to first sorbent assembly 14A or second sorbent assembly 14B. As shown in FIG. 1, inlet valve 12 is positioned so that the process stream is directed to first sorbent assembly 14A. The process stream contains $CO_2$. Exemplary incoming process streams for $CO_2$ removal system 10 contain between about 0.5% $CO_2$ and about 1% $CO_2$ by volume.

First sorbent assembly 14A includes a solid amine sorbent. Solid amine sorbent 26 is contained within first sorbent assembly 14A. Solid amine sorbent 26 is a regenerable $CO_2$ sorbent. In one exemplary embodiment, solid amine sorbent 26 includes one of the amine sorbents described in U.S. Pat. No. 6,364,938, which is hereby incorporated by reference in its entirety. Under certain conditions, solid amine sorbent 26 adsorbs $CO_2$ from a process stream flowing through first sorbent assembly 14A and in contact with solid amine sorbent 26. In this case, $CO_2$ is removed from the process stream flowing through first sorbent assembly 14A when it is adsorbed by solid amine sorbent 26. Under other conditions, solid amine sorbent 26 desorbs $CO_2$ to a process stream flowing through first sorbent assembly 14A and in contact with solid amine sorbent 26. Here, $CO_2$ from solid amine sorbent 26 is taken up by the process stream and carried away from first sorbent assembly 14A. The temperature of and pressure surrounding solid amine sorbent 26 determines whether solid amine sorbent 26 adsorbs $CO_2$ or desorbs $CO_2$. Second sorbent assembly 14B is generally located near and can have identical or similar size and dimensions to first sorbent assembly 14A. Second sorbent assembly 14B also includes solid amine sorbent 26. First sorbent assembly 14A and second sorbent assembly 14B are designed to generally operate in opposing sorption modes. That is, when first sorbent assembly 14A is adsorbing $CO_2$, second sorbent assembly 14B is desorbing $CO_2$. When first sorbent assembly 14A is desorbing $CO_2$, second sorbent assembly 14B is adsorbing $CO_2$.

First sorbent assembly 14A and second sorbent assembly 14B are thermally linked by a heat exchange system. In the embodiment illustrated in FIG. 1, the heat exchange system includes thermoelectric device 16. Thermoelectric device 16 is positioned between first sorbent assembly 14A and second sorbent assembly 14B. Thermoelectric devices take advantage of the thermoelectric effect, which describes the direct conversion of temperature differences to electric voltage and vice versa. A thermoelectric device creates a voltage when there is a different temperature on each side. Conversely, when a voltage is applied to a thermoelectric device, it creates a temperature difference (i.e. one side is heated while the other side is cooled). For example, when a voltage is applied to thermoelectric device 16, one side of thermoelectric device 16 generates heat and heats adjacent first sorbent assembly 14A. At the same time, the other side of thermoelectric device 16 is cooled and cools adjacent second sorbent assembly 14B. The voltage is reversed to cool first sorbent assembly 14A and heat second sorbent assembly 14B. Thermoelectric device 16 provides an efficient means of temperature adjustment without requiring a significant amount of power. While the heat exchange system can take forms other than a thermoelectric device, $CO_2$ removal system 10 will be described in greater detail where the heat exchange system is a thermoelectric device.

Figure 6:
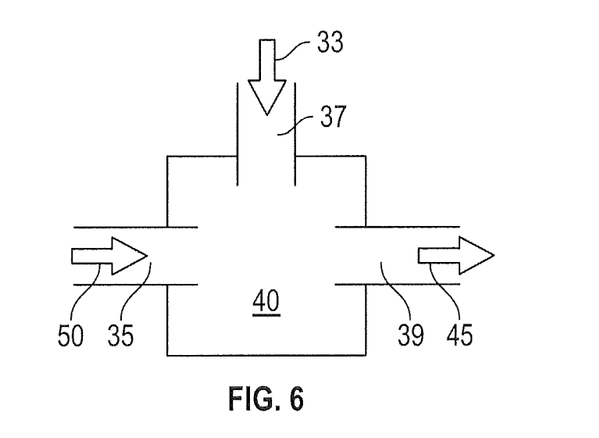

Gas stream outlet valve 18 communicates with first sorbent assembly 14A and second sorbent assembly 14B. Gas stream outlet valve 18 allows a process stream 50 that has passed through a $CO_2$ adsorbing bed (first sorbent assembly 14A or second sorbent assembly 14B) to exit $CO_2$ removal system 10 and, as shown in FIG. 6, enter the mixing chamber 40 via inlet 35 where it is combined with a process stream 33 from the environmental control system via inlet 37 and the combined process stream 45 leaves the mixing chamber via outlet 39 and is delivered to the aircraft cabin. At a given time, gas stream outlet valve 18 communicates with the $CO_2$ adsorbing bed but not the $CO_2$ desorbing bed.

$CO_2$ outlet valve 20 also communicates with first sorbent assembly 14A and second sorbent assembly 14B. $CO_2$ outlet valve 20 allows a process stream that has passed through a $CO_2$ desorbing bed (first sorbent assembly 14A or second sorbent assembly 14B) to exit $CO_2$ removal system 10. The process stream exiting $CO_2$ removal system 10 through $CO_2$ outlet valve 20 generally has a higher concentration than the process stream entering $CO_2$ removal system 10 through inlet valve 12. The process stream exiting through $CO_2$ outlet valve may communicate directly with the ambient environment or may pass through an ambient outlet valve.

In one embodiment of $CO_2$ removal system 10, $CO_2$ outlet valve 20 is positioned between first sorbent assembly 14A, second sorbent assembly 14B and the ambient outlet valve 22. Ambient outlet valve 22 opens to the ambient environment when the ambient pressure is less than that of the pressurized cabin and $CO_2$ removal system and reduces pressure on the outlet side of first sorbent assembly 14A and second sorbent assembly 14B to increase the rate of $CO_2$ removal (desorption) from the desorbing bed. As discussed in greater detail below, ambient outlet valve 22 allows $CO_2$ removal system 10 to produce an exiting process stream rich in $CO_2$. The ambient outlet valve is controlled by controller 24.

Figure 2:
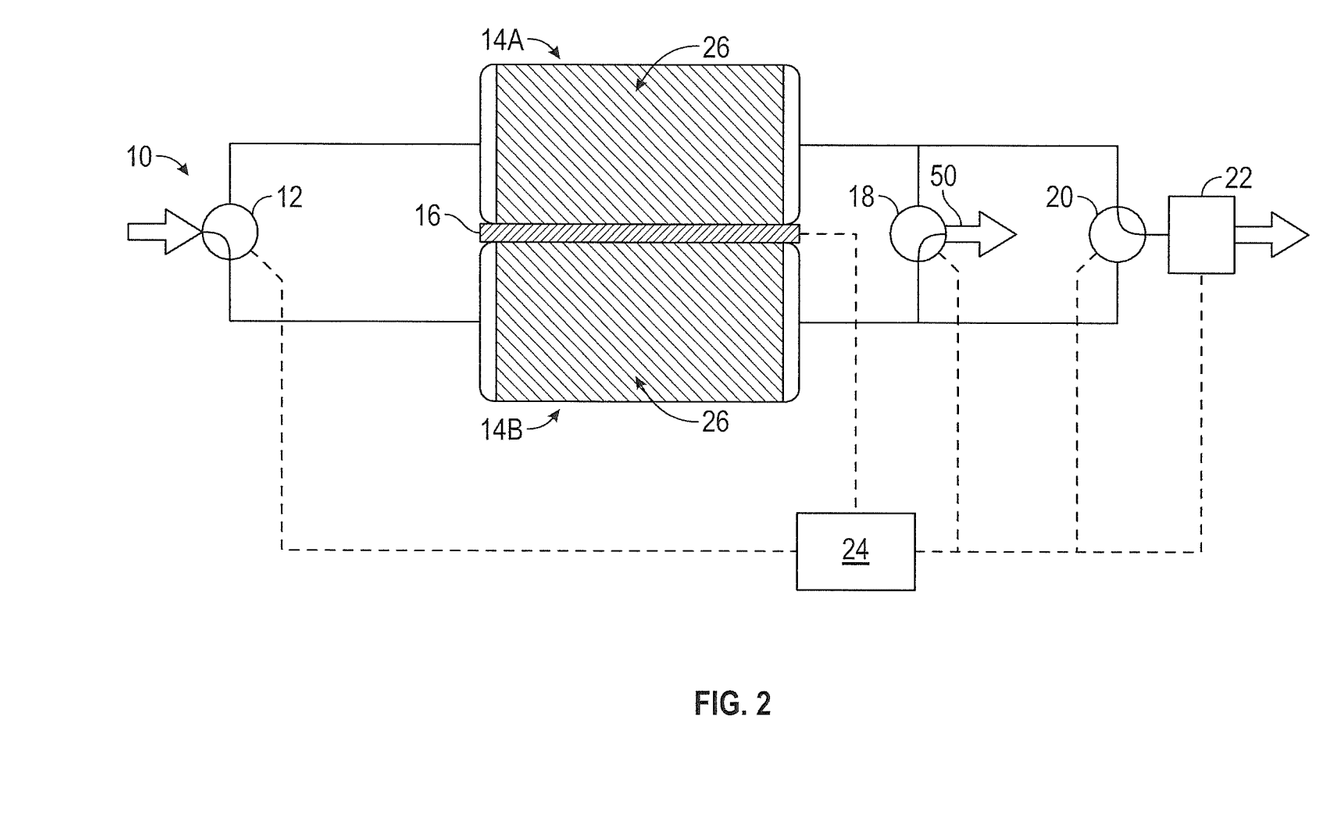

In the embodiment of $CO_2$ removal system 10 shown in FIGS. 1 and 2, controller 24 communicates with inlet valve 12, thermoelectric device 16, gas stream outlet valve 18, $CO_2$ outlet valve 20 and ambient outlet valve 22. Controller 24 controls the valves and heat exchange system of $CO_2$ removal system 10 to cycle the first sorbent assembly 14A and second sorbent assembly 14B between $CO_2$ adsorption and $CO_2$ desorption. The role of controller 24 and how the valves, heat exchange system and pump operate during the $CO_2$ removal process are discussed in additional detail below.

As shown in FIGS. 1 and 2, first sorbent assembly 14A and second sorbent assembly 14B may be thermally linked by thermoelectric device 16. During operation of $CO_2$ removal system 10, a voltage may be applied to thermoelectric device 16 such that the $CO_2$ adsorbing bed is cooled while the $CO_2$ desorbing bed is heated. Thermoelectric device 16 generally maintains the $CO_2$ desorbing bed at a higher temperature than the $CO_2$ adsorbing bed. The controller 24 controls when the desorption is driven by reduced pressure via the ambient outlet valve 22, temperature differential via the thermoelectric device 16, or a combination thereof. The controller 23 can direct the system based on the aircraft status. For example, when cruising at altitude the reduced ambient air pressure can provide reduced pressure to facilitate desorption.

As shown in FIG. 1, $CO_2$ removal system 10 is operating in a state where first sorbent assembly 14A is the adsorbing bed. A process stream enters $CO_2$ removal system 10 through inlet valve 12. Inlet valve 12 is positioned to allow the process stream to enter first sorbent assembly 14A. $CO_2$ is adsorbed to solid amine sorbent 26 in first sorbent assembly 14A. Solid amine sorbent 26 has a defined capacity for $CO_2$ adsorption. The temperature of solid amine sorbent 26 and the $CO_2$ pressure within first sorbent assembly 14A determine how much $CO_2$ can be loaded onto solid amine sorbent 26. As the temperature of solid amine sorbent 26 decreases, the loading capacity for $CO_2$ adsorption increases. As the partial pressure of $CO_2$ within first sorbent assembly 14A increases, the loading capacity for $CO_2$ adsorption also increases. The adsorption of $CO_2$ by solid amine sorbent 26 is exothermic. Thus, as $CO_2$ is adsorbed by solid amine sorbent 26, the temperature of solid amine sorbent 26 increases, reducing its capacity to adsorb $CO_2$ until it reaches an equilibrium state where the temperature of solid amine sorbent 26 prevents further $CO_2$ adsorption. Thermoelectric device 16 may operate to cool first sorbent assembly 14A and, hence, solid amine sorbent 26 contained within first sorbent assembly 14A. By actively cooling first sorbent assembly 14A, the $CO_2$ loading capacity of solid amine sorbent 26 may be increased allowing additional $CO_2$ adsorption within first sorbent assembly 14A. Since first sorbent assembly 14A is cooled by thermoelectric device 16 as $CO_2$ is adsorbed by solid amine sorbent 26, a temperature-related pressure increase is generally not observed during $CO_2$ adsorption. After passing through first sorbent assembly 14A, the process stream 30 is removed from $CO_2$ removal system 10 via gas stream outlet valve 18. The process stream removed through gas stream outlet valve 18 has a lower amount of $CO_2$ than the process stream that entered $CO_2$ removal system 10 through inlet valve 12.

At the same time that first sorbent assembly 14A is adsorbing $CO_2$, second sorbent assembly 14B is desorbing $CO_2$. Second sorbent assembly 14B includes solid amine sorbent 26 that contains adsorbed $CO_2$ from an earlier $CO_2$ adsorption cycle. The desorption of $CO_2$ by solid amine sorbent 26 is endothermic. As noted above, as the temperature of solid amine sorbent 26 decreases, the loading capacity for $CO_2$ adsorption increases. Thus, as $CO_2$ is desorbed by solid amine sorbent 26, the temperature of solid amine sorbent 26 decreases, making it more difficult to desorb $CO_2$ until it reaches an equilibrium state where the temperature of solid amine sorbent 26 prevents further $CO_2$ desorption. At the same time that thermoelectric device 16 operates to cool first sorbent assembly 14A, thermoelectric device 16 heats second sorbent assembly 14B. By actively heating second sorbent assembly 14B, the $CO_2$ loading capacity of solid amine sorbent 26 is decreased making it easier to desorb $CO_2$ from solid amine sorbent 26 within second sorbent assembly 14B.

Ambient outlet valve 22 operates to reduce the partial pressure of $CO_2$ at second sorbent assembly 14B when the ambient air pressure is less than the pressure of the $CO_2$ removal system 10 (which is typically equivalent to the pressure of the aircraft cabin). As noted above, as the partial pressure of $CO_2$ within second sorbent assembly 14B increases, the loading capacity for $CO_2$ adsorption also increases. Ambient outlet valve 22 communicates with the $CO_2$ desorbing bed—second sorbent assembly 14B in the system shown in FIG. 1. Thus, as ambient outlet valve 22 opens to allow fluid to move away from $CO_2$ removal system 10, the partial pressure of $CO_2$ at second sorbent assembly 14B is reduced, thereby reducing the $CO_2$ loading capacity of solid amine sorbent 26 within second sorbent assembly 14B. Since the $CO_2$ loading capacity of the desorbing bed is reduced, $CO_2$ present in second sorbent assembly 14B is more easily removed from solid amine sorbent 26. A process stream containing high levels of $CO_2$ is removed from second sorbent assembly 14B and exits $CO_2$ removal system 10 via $CO_2$ outlet valve 20. The process stream removed through $CO_2$ outlet valve 20 has a higher amount of $CO_2$ than the process stream that entered $CO_2$ removal system 10 through inlet valve 12. In exemplary embodiments the removed process stream contains at least about 90% $CO_2$ by volume. In more exemplary embodiments the removed process stream contains at least about 95% $CO_2$ by volume.

FIG. 2 illustrates the $CO_2$ removal system 10 of FIG. 1 where the $CO_2$ adsorbing and $CO_2$ desorbing beds are reversed. Having adsorbed $CO_2$ according to the description above and shown in FIG. 1, first sorbent assembly 14A is now desorbing $CO_2$ in FIG. 2. Likewise, having given up its adsorbed $CO_2$ according to the description above and shown in FIG. 1, second sorbent assembly 14B is now adsorbing $CO_2$ in FIG. 2. Controller 24 adjusts inlet valve 12, thermoelectric device 16, gas stream outlet valve 18, $CO_2$ outlet valve 20 and ambient outlet valve 22 so that the process and output streams are flowing through the proper sorbent assemblies. Inlet valve 12 is positioned to allow the process stream to enter second sorbent assembly 14B. Thermoelectric device 16 operates to cool second sorbent assembly 14B and heat first sorbent assembly 14A. After passing through second sorbent assembly 14B, the process stream is removed from $CO_2$ removal system 10 via gas stream outlet valve 18. Ambient outlet valve 22 operates to reduce the partial pressure of $CO_2$ at first sorbent assembly 14A. A process stream containing high levels of $CO_2$ is removed from first sorbent assembly 14A and exits $CO_2$ removal system 10 via $CO_2$ outlet valve 20.

The descriptions of the $CO_2$ adsorbing bed (first sorbent assembly 14A) and the $CO_2$ desorbing bed (second sorbent assembly 14B) in FIG. 1 above illustrate a snapshot of adsorption and desorption. Between adsorption and desorption modes, each bed can enter a transitional state. For example, in the case of the adsorbing bed, once solid amine sorbent 26 of first sorbent assembly 14A has reached its $CO_2$ adsorption capacity, first sorbent assembly 14A is no longer adsorbing $CO_2$. First sorbent assembly 14A can now be heated to increase the $CO_2$ partial pressure within first sorbent assembly 14A. By heating first sorbent assembly 14A, the $CO_2$ loading capacity of solid amine sorbent 26 within first sorbent assembly 14A is reduced, preparing it for the $CO_2$ desorption cycle. The voltage applied to thermoelectric device 16 is reversed to accommodate the heating change in this transitional state. At the same time, solid amine sorbent 26 of second sorbent assembly 14B has released all of the $CO_2$ it is capable of desorbing to the low pressure process stream. Second sorbent assembly 14B can now be cooled to increase the $CO_2$ loading capacity of solid amine sorbent 26 within second sorbent assembly 14B. By cooling second sorbent assembly 14B, the $CO_2$ loading capacity of solid amine sorbent 26 within second sorbent assembly 14B is increased, preparing it for the $CO_2$ adsorption cycle.

The transitional states described above can be isolated from the adsorbing and desorbing operations or integrated within the adsorbing and desorbing operations. For example, first sorbent assembly 14A can be isolated from $CO_2$ removal system 10 using valves 12, 18 and 20 to prevent process stream flow through first sorbent assembly 14A. First sorbent assembly 14A can then be heated to increase the pressure within first sorbent assembly 14A. Once first sorbent assembly 14A has been heated to an appropriate temperature, valves 12, 18 and 20 can be positioned to allow first sorbent assembly 14A to transition to the desorption mode. Alternatively, first sorbent assembly 14A can transition to the desorption mode followed by heating and application of negative pressure to increase the rate of $CO_2$ desorption. Whether the transitional states are isolated or integrated within $CO_2$ removal system 10 will depend on application or efficiency requirements and design considerations for $CO_2$ removal system 10.

Figure 3:
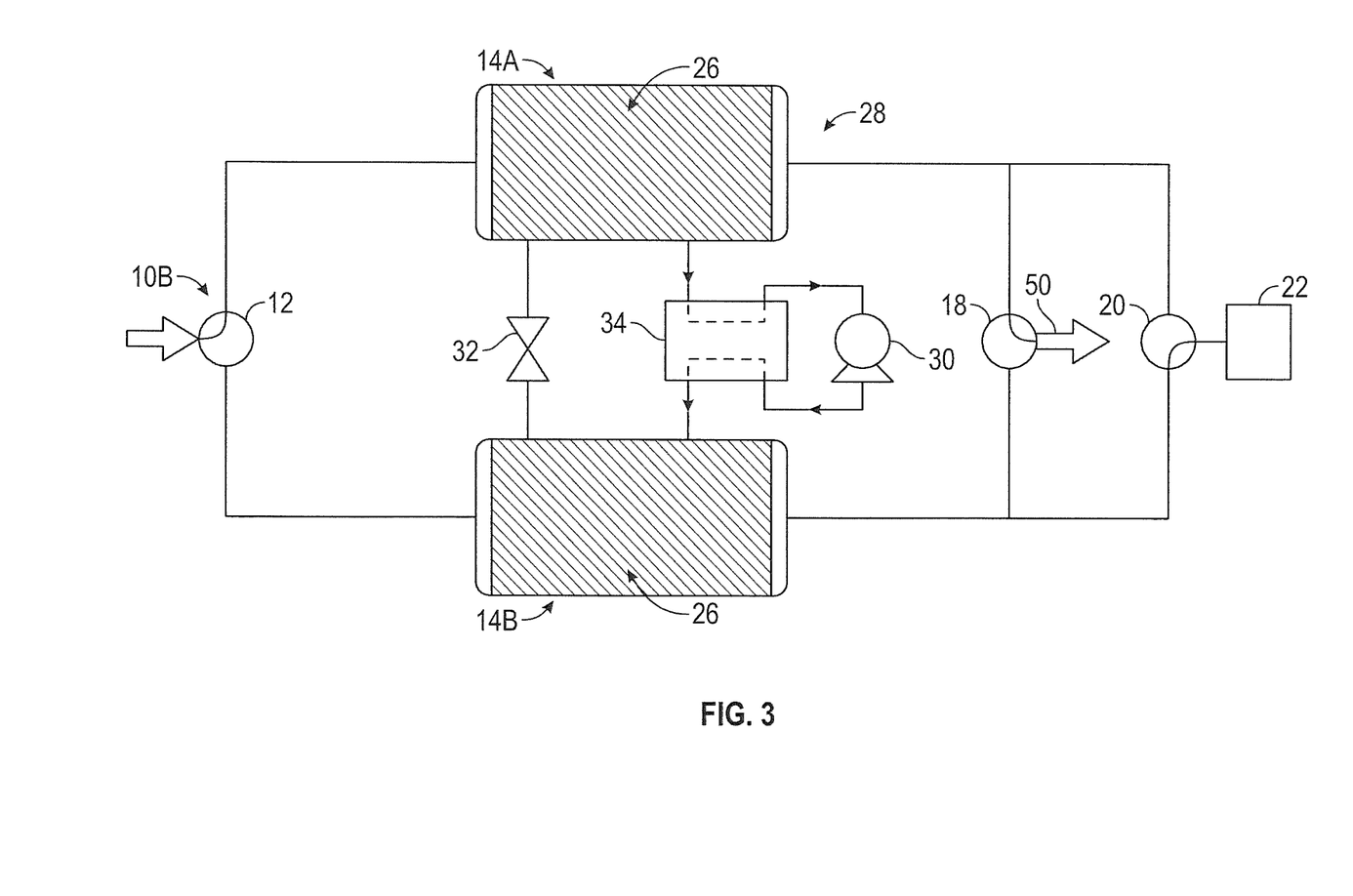
Figure 4:
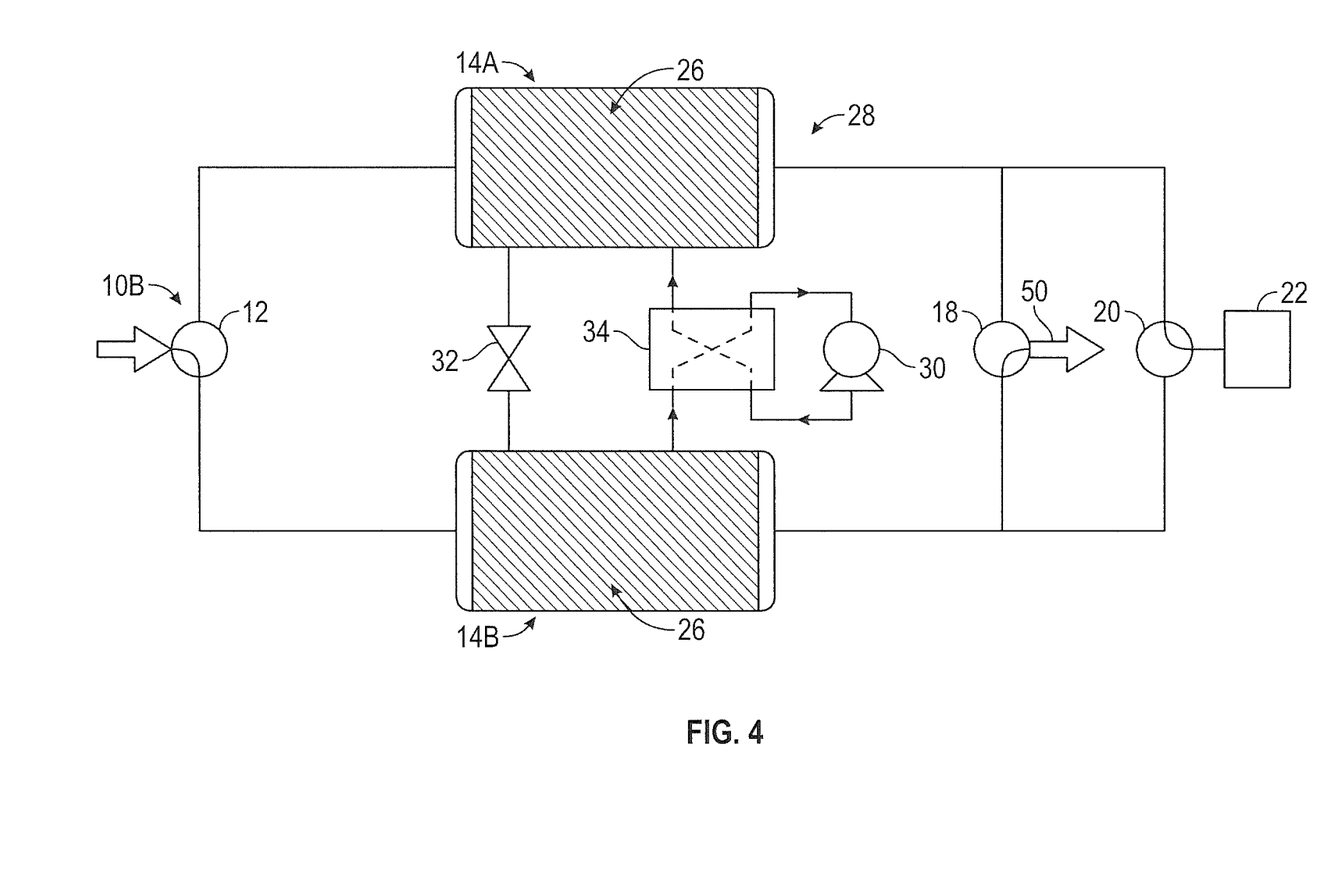

FIG. 3 illustrates an alternative embodiment of a $CO_2$ removal system ($CO_2$ removal system 10B) in which thermoelectric device 16 has been replaced by heat exchange system 28. In one embodiment, heat exchange system 28 operates as a vapor-compression refrigeration cycle. Heat exchange system 28 includes heat pump 30, expansion device 32 and reversing valve 34. First sorbent assembly 14A is adsorbing $CO_2$ and functions as the evaporator. Heat is transferred from first sorbent assembly 14A to a refrigerant within heat exchange system 28. The refrigerant is delivered to reversing valve 34, where it is directed to heat pump 30. Heat pump 30 functions as the compressor and delivers the refrigerant to second sorbent assembly 14B. Second sorbent assembly 14B is desorbing $CO_2$ and functions as the condenser. Heat is transferred from the refrigerant to second sorbent assembly 14B. The refrigerant is delivered to expansion device 32 where it expands. The refrigerant is then delivered to first sorbent assembly 14A to repeat the process. The flow of refrigerant is reversed using reversing valve 34 when the adsorbing and desorbing beds are cycled. FIG. 4 illustrates $CO_2$ removal system 10B where second sorbent assembly 14B is adsorbing $CO_2$ and first sorbent assembly 14A is desorbing $CO_2$. Here, second sorbent assembly 14B functions as the evaporator and first sorbent assembly 14A functions as the condenser. Reversing valve 34 can adjust the flow of refrigerant within heat exchange system 28 so that heat pump 30 only pumps refrigerant in a single direction.

Figure 5:
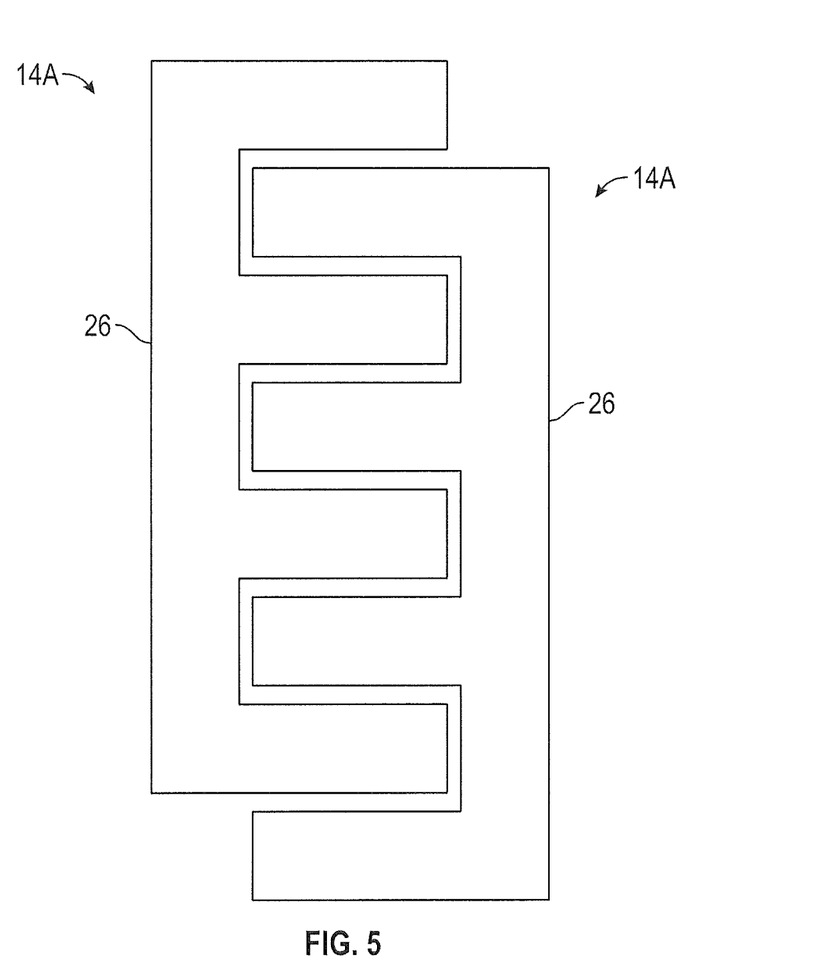

FIG. 5 shows an embodiment wherein the first sorbent assembly 14A and the second sorbent assembly 14B are thermally linked passively by interleaving the two sorbent assemblies.

A wide range of temperatures are suitable for first sorbent assembly 14A and second sorbent assembly 14B during the $CO_2$ removal process. $CO_2$ removal system 10 generally operates most effectively at temperatures between about 15° C. and about 80° C. In an exemplary embodiment, the desorbing bed is heated to a temperature between about 35° C. and about 80° C. while the adsorbing bed is cooled to a temperature between about 15° C. and about 25° C. In one exemplary embodiment, the desorbing bed is heated to a temperature between about 55° C. and about 80° C. Due to the energy required to actively heat and cool first sorbent assembly 14A and second sorbent assembly 14B, keeping the temperature difference between the desorbing bed and the adsorbing bed small is desirable. Determination of ideal temperature differences depends upon the particular application $CO_2$ removal system 10 is designed for in addition to $CO_2$ removal rate requirements. In exemplary embodiments, the temperature difference between the desorbing bed and the adsorbing bed is between about 10° C. and about 65° C. In one exemplary embodiment, the temperature difference between the desorbing bed and the adsorbing bed is between about 10° C. and about 35° C. The low temperature difference between the desorbing and adsorbing beds generally allows $CO_2$ removal system 10 to operate with much greater efficiency than liquid amine and molecular sieve systems.

A wide range of pressures can be drawn on the desorbing bed. $CO_2$ removal system 10 generally operates most effectively where low ambient pressure generates a low pressure on the desorbing bed between 3.5 kPa (0.5 psi) and 100 kPa (14.5 psi). In an exemplary embodiment, a low pressure of between 20 kPa (3.0 psi) and 55 kPa (8.0 psi) is drawn on the desorbing bed.

$CO_2$ removal system 10 can employ a wide range of cycle times between bed transitions from $CO_2$ adsorption to $CO_2$ desorption and vice versa. As is the case with the temperature difference between the adsorbing bed and the desorbing bed, determination of ideal cycle times depends upon the particular application $CO_2$ removal system 10 is designed for in addition to $CO_2$ removal rate requirements. In exemplary embodiments, the adsorbing and desorbing beds cycle at an interval no greater than about 30 minutes. In one exemplary embodiment, the adsorbing and desorbing beds cycle at an interval no greater than about 20 minutes.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for processing recirculation air recovered from an aircraft cabin comprising:
   a mixing chamber and a carbon dioxide removal system, wherein the carbon dioxide removal system has an inlet for recovered recirculation air from the aircraft cabin, at least two assemblies of carbon dioxide sorbent that are thermally linked; an outlet to the mixing chamber; a $CO_2$ outlet valve and a controller for managing desorption of carbon dioxide from the sorbent depending on aircraft status, and
   further wherein the mixing chamber has an inlet from the carbon dioxide removal system, an inlet from an environmental control system, and an outlet connected to the aircraft cabin.

2. The system of claim 1, wherein the assemblies are thermally linked by a thermoelectric device.

3. The system of claim 1, wherein the assemblies are passively thermally linked.

4. The system of claim 1, wherein the assemblies are interleaved.

5. The system of claim 1, wherein the carbon dioxide sorbent comprises a solid amine sorbent.

6. The system of claim 1, further comprising an ambient outlet valve.

7. A method for processing recovered recirculation air discharged from an aircraft cabin comprising:
   supplying recovered recirculation air from the aircraft cabin to a carbon dioxide removal system having at least two thermally linked assemblies of carbon dioxide sorbent;
   removing carbon dioxide from the recovered recirculation air to form processed recirculation air;
   removing carbon dioxide from the carbon dioxide sorbent;
   mixing the processed recirculation air with conditioned fresh air; and
   sending the mixture to the aircraft cabin, wherein the removal of carbon dioxide from the carbon dioxide sorbent is by reduced pressure, elevated temperature or both and the method of removal is determined the by aircraft status.

8. The method of claim 7, wherein reduced pressure is provided by ambient air when the ambient air has a pressure less than the cabin air.

9. The method of claim 7, wherein the at least two thermally linked assemblies are interleaved.

10. The method of claim 7, wherein the at least two assemblies of carbon dioxide sorbent comprise a solid amine sorbent.

* * * * *